United States Patent [19]

Roche

[11] Patent Number: 4,879,557
[45] Date of Patent: Nov. 7, 1989

[54] GENERAL PURPOSE KEYBOARD FOR CENTRAL PROCESSING UNIT WITH MICROPROCESSOR AND USE OF THIS KEYBOARD WITH A MICROCOMPUTER

[75] Inventor: Patrick Roche, Fontenay Le Fleury, France

[73] Assignee: La Souterraine S.A., Marseille, France

[21] Appl. No.: 118,490

[22] Filed: Nov. 6, 1987

[51] Int. Cl.$^4$ .............................................. G06F 3/02
[52] U.S. Cl. ........................................ 341/23; 341/22; 341/31; 250/221
[58] Field of Search ......... 340/365 VL, 365 P, 365 S; 341/22, 23, 31; 364/234, 234.4, 405; 250/221, 222.1

[56] References Cited

U.S. PATENT DOCUMENTS

| | | | |
|---|---|---|---|
| Re. 31,649 | 8/1984 | Brodbeck | 340/365 VL |
| 3,560,964 | 12/1968 | Bedell et al. | 340/365 VL |
| 3,600,592 | 8/1971 | Mahan | 340/365 VL |
| 3,879,722 | 4/1975 | Knowlton | 340/711 |

FOREIGN PATENT DOCUMENTS

| | | | |
|---|---|---|---|
| 0174733 | 10/1982 | Japan | 340/365 VL |
| 0043027 | 3/1983 | Japan | 340/365 VL |
| 0090137 | 5/1984 | Japan | 340/365 VL |

Primary Examiner—Donald J. Yusko
Assistant Examiner—Tyrone Queen
Attorney, Agent, or Firm—John C. Malloy

[57] ABSTRACT

A general purpose keyboard for a central processing unit with microprocessor 9, characterized in that it includes at least one set 300 of variable allocation keys, a removable booklet 2 comprising at least two pages 20, 21 specifying allocation of the keys, photoelectric receiver R0, R1 for detecting the position of the pages 20, 21 of the booklet 2 and a keyboard processing unit 40 for supplying, in response to the detection of the position of the pages 20, 21 of the booklet 2 and to the activation of a key 32 of the keyboard belonging to the central processing unit or set 300, a different ASCII code according to the position of the pages of the booklet 2.

11 Claims, 4 Drawing Sheets

Fig:1

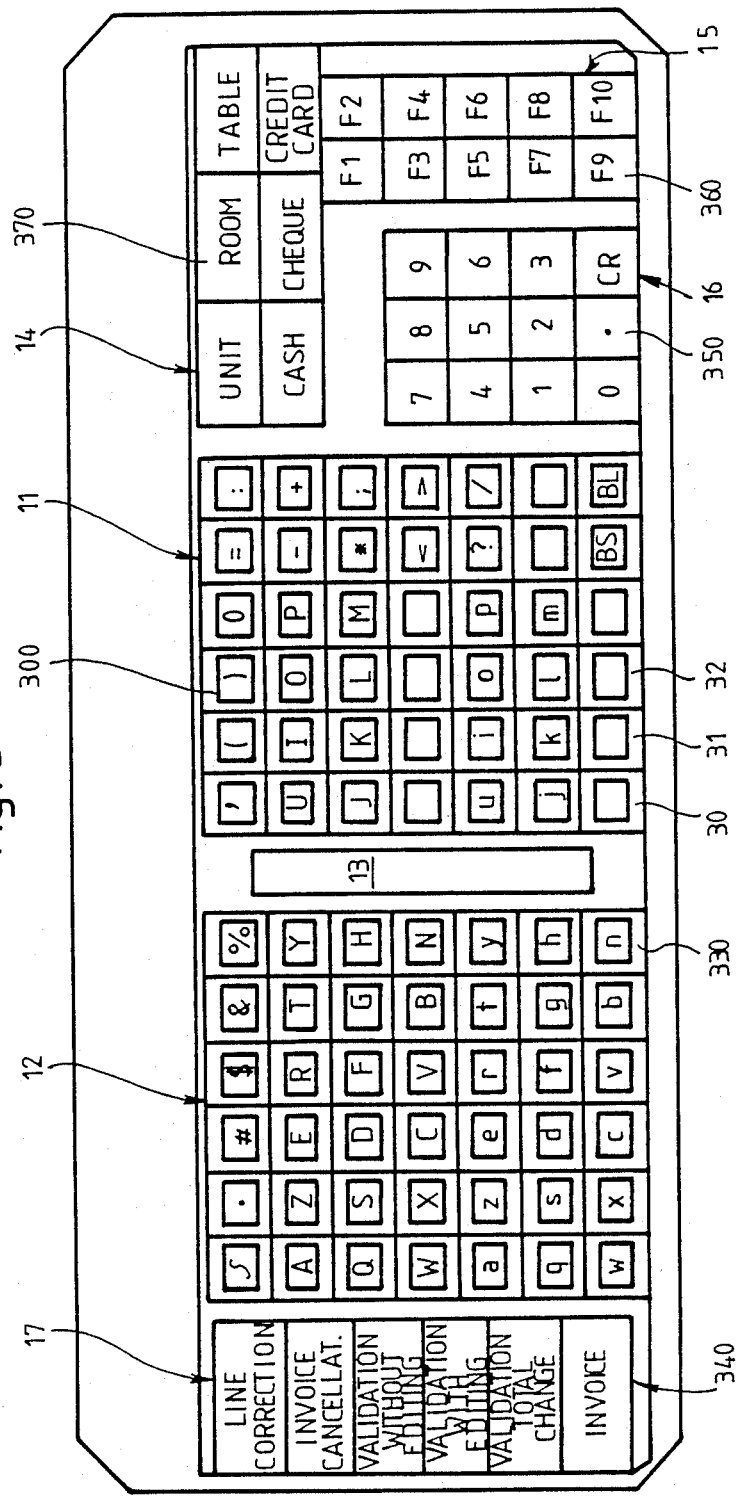
Fig: 3

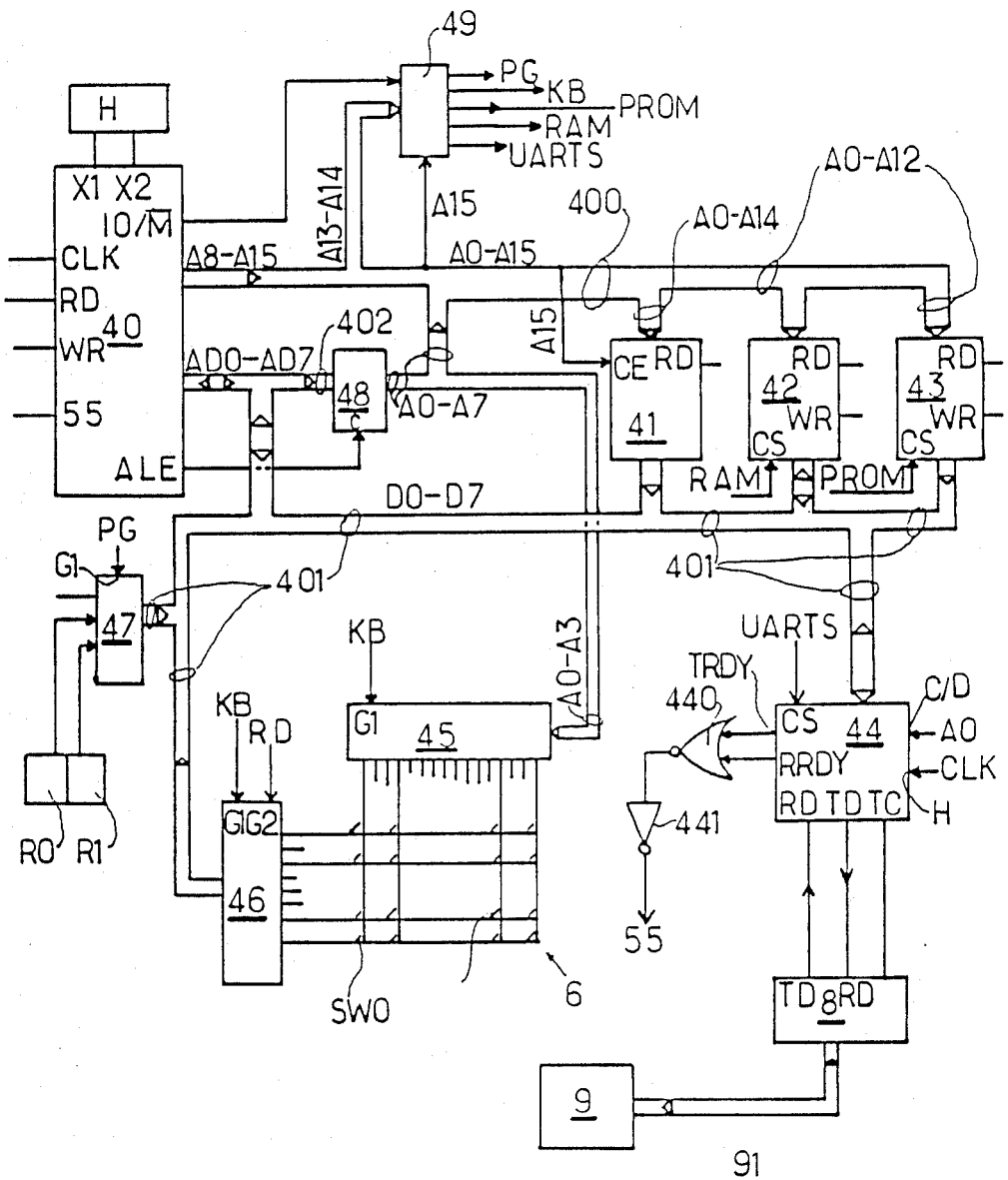
Fig:4

GENERAL PURPOSE KEYBOARD FOR CENTRAL PROCESSING UNIT WITH MICROPROCESSOR AND USE OF THIS KEYBOARD WITH A MICROCOMPUTER

BACKGROUND OF THE INVENTION

Field of the Invention

This invention concerns a general purpose keyboard for a central processing unit with a microprocessor and the use of this keyboard with a microcomputer so that it can adapt itself to multiple applications such as, for example, the management of hotels, restaurants, businesses and service companies.

It is a known fact that microcomputer keyboards include a set of alphanumeric keys and usually several function keys whose allocation is variable and is dependent upon the application software used. Generally speaking, the number of function keys on these keyboards is limited to ten and comprise variable controls according to the different application softwares used.

It is also a known fact that, in order to assist the user of these function keys, as regards storing the commands constituted by these function keys, of associating with these keys, a small book is provided. This book includes an opening framing these keys and, opposite the function keys, listings specifying, according to the application software, the orders carried out by these keys. This small booklet merely has a reminder function and does not determine allocation of keys according to the position of the pages of the booklet.

It is also a known fact that, as regards cash registers, that the allocation of keys can be modified according to the position of the pages of a booklet appearing opposite the keys. This allocation is set for a specific application. Thus, each cash register is personalized for each application to a given business. However, this device lacks flexibility, as each time the application is changed, the cash register needs to be changed because the booklets are integral with the cash registers via the page position detection system. Finally, these cash registers do not permit the management and use of an application program enabling the management of stocks or accounting, for example, to be carried out. In this instance, if it is desired to obtain such a system, it is necessary to connect the cash register to a computer microcomputer.

Summary of the Invention

One aim of this invention is to offer a keyboard for a central processing unit with microprocessors, allocation of whose keys can easily be modified according to the contemplated applications. This first aim is achieved by the fact that the keyboard includes a set of variable allocation keys, a removable booklet comprising at least two pages specifying allocation of keys and initial means for remote detection of the position of the pages of the booklet. Second means are also included for supplying, in response to the detection of the position of the pages of the booklet and to the activation of a key of the keyboard belonging to the said unit, a different ASCII code according to the pages of the booklet.

A second aim of the invention is to offer a general purpose keyboard which enables bidirectional exchanges to be made with the central processing unit in the slave mode. This second aim is attained by the fact that the keyboard includes three means for transitory storing the ASCII codes to be transmitted and corresponding to the activation of a certain number of keys and a multi-purpose asynchronous acceptance and transmissions circuit operating as a slave to the central processing unit.

According to another characteristic of the keyboard, the first means comprises photoelectric emission and acceptance cells for detecting the position of the booklet. The second means comprises a scanning keyboard interface connected to the data bus of a microprocessor, a programmable Read Only Memory including correspondence tables between the keys and the ASCII codes according to the position of the pages and a Read Only Memory for storing the keyboard management program and orders originating from the central processing unit.

According to another characteristic, a third means for storing ASCII codes comprises a read/write memory.

Another aim of the invention is to offer a multi-purpose keyboard which can function as a conventional alphanumeric keyboard for a microcomputer or computer. This aim can be attained by the fact that the variable allocation keys include on the upper face the gravures of an alphabetical keyboard, selection as regards the programmable Read Only Memory from the table of ASCII codes corresponding to the alphabetical postings being effected following an order transmitted by the central processing unit to the keyboard processor.

A further aim of the invention is another embodiment enabling the booklet to be removed and allowing it to cooperate with special keys so as to ensure that the dimensions of the keyboard thus obtained do not increase excessively. According to one characteristic, this aim can be attained by the fact that the removable booklet includes a ring binding extending beyond the format of the pages by means of tongues. These are housed under the front face of the keyboard via a cut made in the front face of the keyboard inside a zone adjacent to the set of variable function keys, and notches disposed at the page edge opposite the first means of detection.

According to another characteristic, the keyboard includes two sets of variable allocation keys separated by a front face zone of the said keyboard including an opening whose dimension is adapted to receiving the binding of the removable booklet.

According to another characteristic, the format of the pages of the removable booklet is slightly larger than the space occupied by a set of keys. The keys of a unit comprising projecting shapes adapted to leave spaces between them. The booklet includes cuts adapted to the projecting shapes so that the remaining parts bearing the lists of references come to be placed close to the key concerned in the free spaces. According to another characteristic, the cuts are rectilinear openings. According to another characteristic, the openings are made along a direction perpendicular to the binding.

According to another characteristic, the keys comprise hollow tail pieces with an interdependent cubic base on a face with a projecting form comprising a rectangular parallelepiped whose section is smaller than the section of the cube and corresponding to the width of the cuts.

According to another characteristic, the microprocessor initially reads the data supplied by the photoelectric receivers of the first means of detection and in the second stage, the data delivered via the keyboard interface so as to then address the programmable Read Only Memory which supplies the ASCII codes according to the result of the first reading and to the data delivered by the scanning keyboard interface in the second stage.

Another aim of the invention is to use the keyboard with a microcomputer and an application software which allows very extensive adaptability of the system, depending on the type of business or service one wishes to apply to it. This aim is attained by the fact that the keyboard, microcomputer and application software all constitute a management system emulating a cash register functioning which can adapt to the type of business or service by changing the booklet and data contained in the programmable Read Only Memory.

Finally, the final aim of the invention is to allow for locking of functioning of the keyboard for an application software, type of microcomputer and a user or machine number. This aim can be attained by the fact that the programmable Read Only Memory contains, in addition to the keyboard decoding tables which can be modified according to the applications, access codes allowing for locking of keyboard functioning for the application software envisaged, the type of microcomputer used and as regards the machine or user number.

The invention accordingly comprises of the features of the construction, combination of elements and an arrangement of parts which will be exemplified in the construction hereinafter set forth, and the scope of the invention will be indicated in the claims:

BRIEF DESCRIPTION OF THE DRAWINGS

FIG. 3 is a top view of the keyboard.

FIG. 4 is a schematic representation of the electronic circuit incorporated in the keyboard.

DETAILED DESCRIPTION OF THE PREFERRED EMBODIMENT

Figure 1:
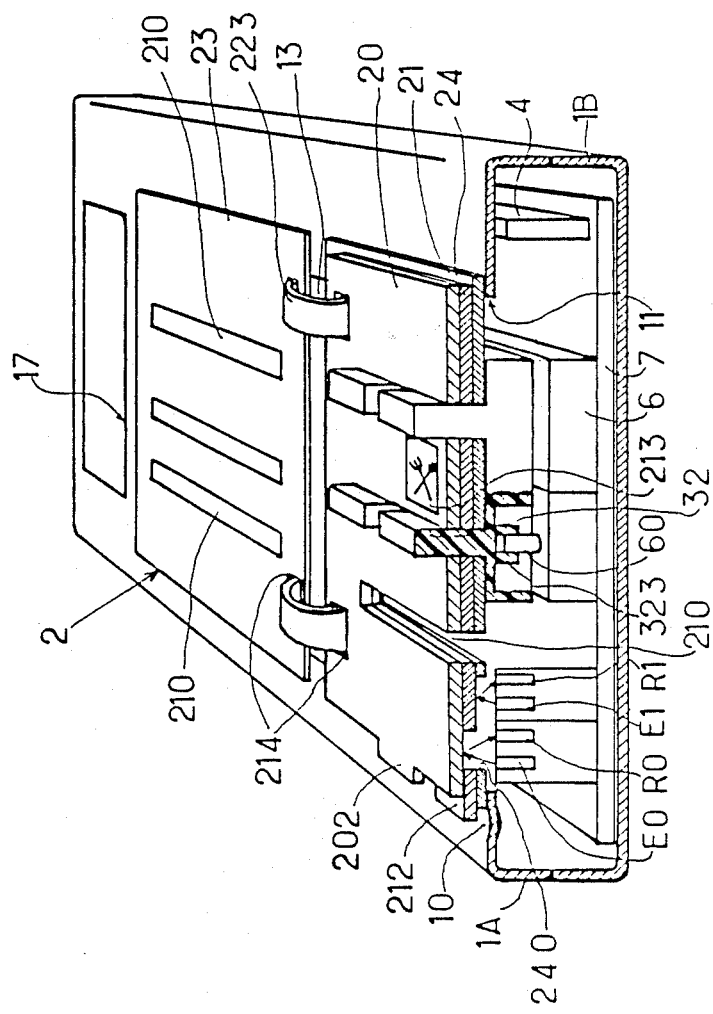
FIG. 1 is a transversal sectional view of the keyboard.
Figure 2:
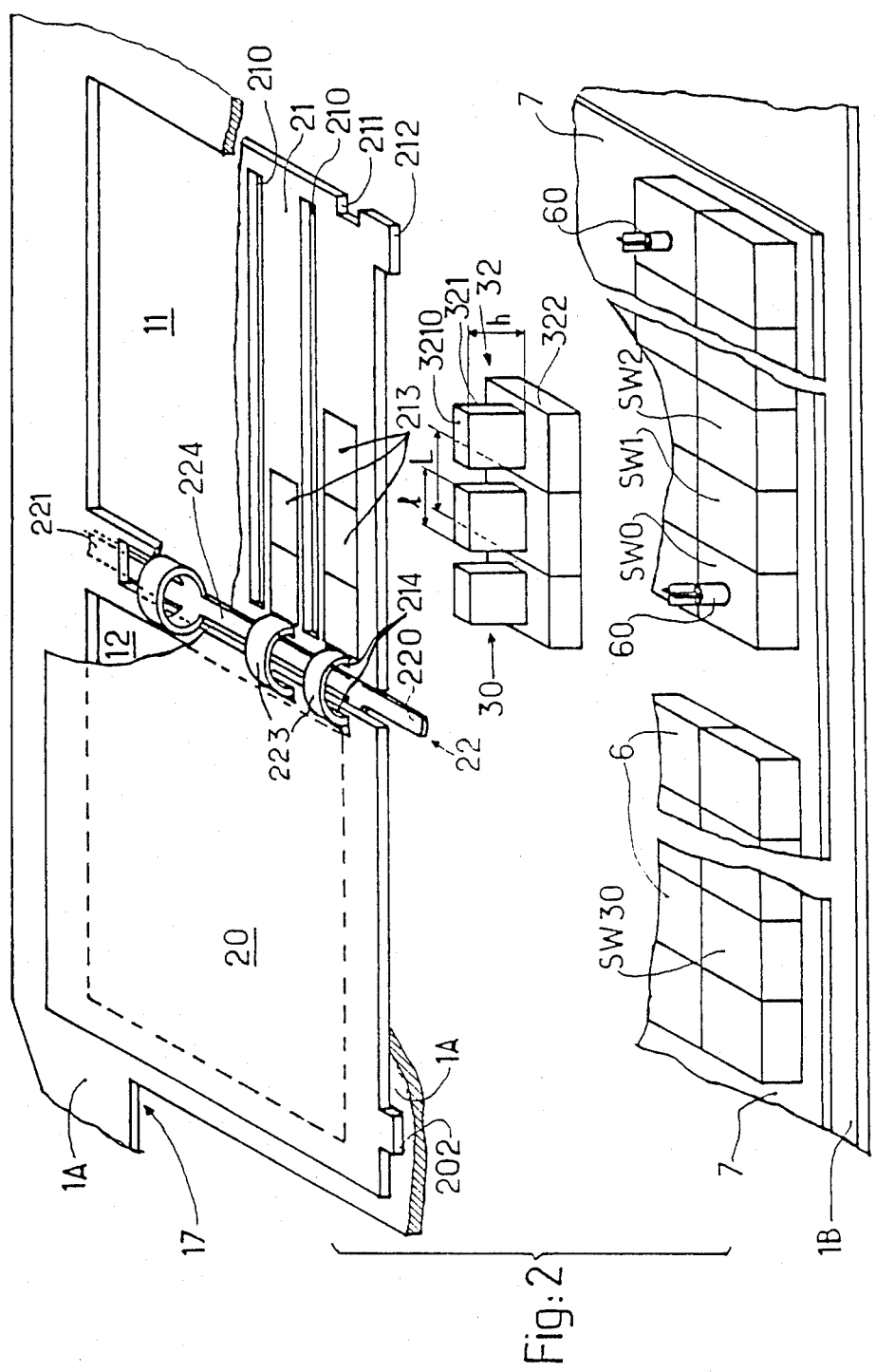
FIG. 2 is a exploded perspective view of the main elements constituting the keyboard.

An important feature of this invention, namely the keyboard, shall now be described in detail in liaison with FIGS. 1 to 3 as regards hardware and with FIG. 4 as regards the electronics section.

The keyboard includes a housing 1 formed of a lower half-housing 1B and an upper half-housing 1A. The upper half-housing 1A includes on its upper face openings 11, 12, 17, 14, 15, and 16 (see FIG. 3) through which pass sets of tail pieces constituting the sets of the keyboard keys. As can be seen from FIG. 3, this upper face of the keyboard includes a first set 300 of 42 variable allocation keys divided into seven lines of six columns, and a second set 330 of 42 variable allocation keys. The first set is disposed inside the opening 12 of the front face of the keyboard. As shall be seen subsequently, one opening 13 situated inside a zone placed between the two sets or units 300, 330 of variable allocation keys accommodates the binding of a key allocation personalization booklet 2. One opening 14 permits the passage of a set of allocation keys defined according to a specific application. In the case of FIG. 3, these keys indicate a hotel trade application of the keyboard, but is clearly apparent that any other application may also be contemplated. An opening 16 of the front face allows for the passage of a set 350 of digital keys and an opening 15 permits the passage of a set 360 of functional keys of the type required for current application softwares used in microcomputers. The set 360 of functional keys can also be used as service keys and also as variable allocation keys together with an application software. Finally, an opening 17 permits the passage of a set 340 of keys dedicated, for example, to certain orders lined to invoicing problems. It is clearly evident that the set of keys 340 and the set of keys 370 may be dedicated to other orders depending on the type of application contemplated. The keys, at least all the sets 300 and 330 with variable allocation, are constituted by tail pieces 32 as represented in FIG. 3. These tail pieces carry a cubic-based hollow stand 322 (see FIG. 2) supporting at its center a rectangular parallelepiped 321 with height h and width l. It will be observed that, in the embodiment represented herein, the width l of the rectangular parallelepiped is smaller than the lateral dimension L of the cube. This being conceived so as to allow for the keys to be activated while avoiding depressing two keys with the same finger. On the upper face 3210 of the rectangular parallelepiped 321, each key of sets 300 and 330 bears alphabetical letters which thus enable an AZERTY or QWERTY keyboard to be established, depending on the type of country in which one wishes to use this keyboard. As can be seen from FIG. 3, the upper section of the set of keys 300, 330 is dedicated to the AZERTY upper case keyboard while the lower part is dedicated to the lower case alphabetical keys. Each tail piece includes inside its hollow base 322 a cylindrical housing 323, FIG. 1 which receives the activating rod 69 of a switch 6. Each tail piece is connected to a switch and thus key 30 is connected to switch SW0, key 31 to switch SW1, key 33 to switch SW2, etc. All the switches connected to the keys of the keyboard constitute the matrix contact panel of FIG. 4 and which comprise a set of 118 contacts. All the switches SW30 denote those switches connected to all the keys 330, all the switches connected to all the keys 340 not having been represented on FIG. 2. Similarly, the switches connected to all the keys 350, 360 and 370 are not represented on FIG. 2. The switches connected to the keys are mounted on a printed circuit plate 7 and are welded onto this plate. On this plate 7 are also mounted, as represented in FIG. 1, infrared photoelectric emitters E0, E1 and two corresponding photoelectric receivers R0, R1. Inside the housing 1, there is also mounted an electronic circuit 4 connected to all the switches 6 and the photoelectric emitters receivers E, R by connectors (not shown), this being effected via tracks of the printed circuit 7. FIG. 1 represents a perspective view of the keyboard with a couple of pages 24, 23 which may be either integral with the front face of the keyboard casing 1A or be connected to the other two pages 20, 21 of a booklet 2. FIG. 3 represents a top view of the keyboard without the booklet 2 and pages 24 and 23.

A booklet 2 is placed so as to be able to be removed from the front face 1A of the keyboard. As can be seen from FIG. 2, this booklet 2 comprises of a binding 22 and at least one pair of pages 20, 21. This binding 22 comprises a plastic rod 224 connecting two rings 223 which pass into the openings 214 of the pages 20, 21, as can be seen on FIG. 2. The rod 224 can be extended by two tabs 220, 221 which can be moved into the opening 13 under the front face of the casing 1A. This opening 13 is smaller than the diameter of the rings 223 so as to keep the binding above the front face of the housing 1A. Thus, it is easy to remove the booklet 2. Each page 20 to 24 includes a set of rectilinear openings 210 with dimensions adapted to the dimensions of the upper rectangular parallelepiped 321 of the tail pieces 32 so that the latter can slid into the openings 210. Thus, as regards the keyboard represented in FIG. 3, each page shall include a set of seven lines of openings 210. Between these lines, each page includes a collection of rectangular spaces 213 on which can be placed the inscriptions specifying possible allocations of keys. Page 21 can include inscriptions on both sides and the same applies to page 20, whereas pages 24 and 23 only include inscriptions on one side. Page 21 also includes a guard 212 which allows the page to be easily handled. Similarly, page 20 also has a guide 202 allowing for easy handling of the page, but this is slightly offset in relation to the guide 212. On Page 20, FIG. 2, the openings and inscription rectangles are not represented, but it is essential to ensure that all the pages are all similarly constituted. Page 21 includes, on the edge opposite its binding, a notch or recess 211 disposed opposite the photoelectric emmitter/receiver E0, R0. Page 24 also includes a notch of adequate size to ensure that nothing impedes the path of rays from the photoelectric emitters/receivers E0, R0; E1, R1 towards pages 20, 21. As can be seen from FIG. 1, this notch 211 enables the photoelectric emitter/receiver E0, R0 to detect the presence of page 20 on the side corresponding to page 21. Thus, when page 20 occurs on the side corresponding to page 21, the ray emitted by the photoelectric emitter E0 will pass into the notch 211, encounter page 20, be thrown back onto the latter and return to the photoelectric receiver R0. The photoelectric emitter/receiver E1, R1 detects the presence of page 21. When R1 and R0 do not emit any signal, the two pages 21 and 20 are on the side of the set of keys 330, i.e. to the left of the binding 22 as shown in FIG. 2. When R1 emits a signal and R0 no signal, pages 21 and 20 are disposed as represented on FIG. 2 on both sides of the binding, and when R0 and R1 both emit a signal, pages 21 and 20 are disposed as represented in FIG. 1 on the right side of the binding, i.e. opposite the set of keys 300.

The electronic part 4 of the keyboard comprises, as can be seen from FIG. 4, a microprocessor 9 whose sixteen bit address bus 400 and eight bit data bus 401 are connected to a set of memories. The first Read Only Memory 41 receives on its housing validation input CE the address line A15 and, on its address inputs, the address lines A0 to A14. The eight data outputs of this Read Only Memory are connected to eight data lines D0, D7 of the data bus 401. A Read/Write Memory 42, capacity 512 octets, receives on its input CS the signal RAM originating from a housing 49, delivers on its eight data outputs the data signals to the eight lines D0, D7 of the bus 401 and receives on its thirteen address inputs the address lines A0, A12 of the bus 400. A programmable Read Only Memory 43, capacity 512 octets, receives on thirteen address inputs the address lines A0, A12 of the bus 400 and is connected via its eight data outputs to the lines D0, D7 of the data bus 401. This memory 43 receives on its housing selection input CS the signal PROM delivered by the housing 49. The housing 49 is a multiplexer which input receives two address lines A14, A13 and the signal I0/ M originating from the microprocessor 9. This signal I0/ M is used to select the input/output section or memory section of the circuit of FIG. 4. Thus, when this signal is deactivated, the memory section is selected and when it is activated, the input/output section corresponding to the signal UARTS is selected, this signal being the selection signal of the multi-purpose asynchronous transmission and receiving housing 44. The housing 49 is validated by the address line A15. This housing 49 delivers on a first output a signal PG, the housing 47 validation signal enabling the position of the pages of the booklet 2 to be decoded. On a second output a signal KB, the validation signal of the decoding housing of the matrix of the keyboard switches is delivered. On a third output a signal PROM, the validation signal of the programmable Read Only Memory housing is delivered. On a fourth output a signal RAM, the validation signal of the Read/Write memory 42 is delivered. Finally on a fifth output a signal UARTS, the selection signal of the input/output housing 44 constituted by a multi-purpose asynchronous transmitter/receiver circuit is delivered. When the address line A15 is activated, the housing 49 is validated whereas the Read Only Memory 41 is not validated. On the other hand, when the line A15 is deactivated, the Read Only Memory 41 is activated and the address multiplexing housing 49 is deactivated. The Read Only Memory 41, capacity 2K-octets, enables the entire keyboard management program to be stored. As for the programmable Read Only Memory 43, this contains the tables of codes of the keyboard keys corresponding to the respective significance of the keys according to the positions of the pages of the booklet 2. Thus, when the booklet 2 is in the position represented in FIG. 1, the keyboard keys have a significance given by the codes of a first coding table T1. When the booklet 2 occupies the position shown on FIG. 2, the keyboard keys have a significance given by a second table T2 containing the ASCII codes corresponding to the significance of these keys. Similarly, when the pages of the booklet are disposed symmetrically in relation to the disposition of FIG. 1, it is possible to imagine that the ASCII codes, corresponding to the significance of the activation of the keys, are given by a third table T3. The significance of the ASCII codes of the tables T1, T2, and T3 vary according to the application softwares and associated booklets and the significance of the codes are, for example, loaded by the application software into the programmable Read Only Memory 43 upon the start of a new application. The housing 48 of the diagram of FIG. 4 is present due to the use as a microprocessor 9 of the microprocessor commercialized by the firm of Intel under the reference 8085. This microprocessor has the special feature of having outputs AD0 to AD7 constituting a bus 402 transmitting both the data signals D0 to D7 and the low significance address signals A0 to A7. For these reasons, it is essential to separate the low significance address bus A0 to A7 from the data bus D0 to D7 via the circuit 48 which constitutes a buffer store whose selection input C is validated by the output ALE of the microprocessor 9. This output ALE supplies the address lock signal which appears during the first clock cycle of a machine cycle and enables the low significance addresses to be locked on the buffer store 48. It is quite clear that the invention is in no way limited to the use of the Intel 8085 microprocessor and that in the case where another processor having a sixteen bit address bus and an independent eight bit data bus were to be adopted, the circuits 40, 48 could be replaced by the new processor, the connections being effected onto the address bus 400 and onto the data bus 401. The keyboard processing unit 40 receives on its clock inputs X1 and X2 the outputs of the clock circuit H. The data bus 401 is connected to the eight outputs of a buffer store circuit 46 whose validation inputs G2, G1 respectively receive the signals KB originating from the circuit 49 and the signal RD derived from the processor 40. This signal RD corresponds to a read order from the processing unit 40. This circuit 46 also includes eight inputs which each receive a line from the matrix table constituted by the contacts SW of the switches 6 of the keyboard. The 118 switches association with the corresponding keys 300, 330 to 370 of the keyboard are connected according to a sixteen column eight-line matrix table. The contacts of a switch link one of the eight lines with one of the sixteen columns. The sixteen columns of the keyboard matrix are connected to the outputs of a circuit 45 constituted by a 4 gives 16 decoder. This circuit 45 receives on its four inputs the four address lines A0, A3 of the bus 400. The circuit 45 is validated on its input G1 by the signal KB derived from the circuit 49. This circuit 45, via the decoding of the four address lines A0, A3 allows for a scanning of each of the sixteen columns, a scanning which, via the outputs of the circuit 46, enables the activated key to be indicated. This technique is familiar to the specialist and shall not be described in further detail. The data bus 401 is also connected to the eight outputs on a second "3 gives 8" decoder circuit 47, two of the three inputs respectively receiving the outputs from the photoelectric receivers R0, R1, the third input not being used in the embodiment example described. This decoder circuit 47 is validated on its input G1 by the signal PG delivered by the circuit 49. Finally, the eight lines of the data bus 401 are connected to the eight parallel data inputs of the multi-purpose emitter/receiver asynchronous circuit 44. This circuit 44 could be the circuit commercialized by the firm of Intel under the reference 8251. This circuit 44 is connected via the output TD to the input RD and via the input RD to the output TD of a second circuit 8 of the same type, also constituting an asynchronous multi-purpose transmission and receiving circuit. This circuit 8, via the data bus 91, communicates with the central processing unit 9 of a computer or microcomputer, the circuit 8 constituting an interface for series communicating with the series interface of the keyboard. The connections of these circuits are already familiar to the specialist and shall not be described in more detail. The outputs TRDY and RRDY of the circuit 44 are each connected to an input of a two-input NOR gate 440, the output of which is connected to the input of an inverter 441. The output of this inverter 441 is connected to the input 55 of the processing unit 40 constituting the microprocessor. This input 55 is an interruption input. When either of the TRDY or RRDY outputs is at the "1" logic level, the output of the inverter shall be at the "1" logic level, which shall interrupt the processor program. This interruption occurs when the transmitter is ready, this being signalled by the signal TRDY at the "1" logic level or when the circuit 44 contains a character ready to be sent to the processing unit 40. The special features of this connection thus enable the circuit 44 to be operated in the slave mode in relation to the card of the central processing unit 8, 9. The input C/D of the circuit 44 receives the address line A0 which enables, according to the level of activation or deactivation of this line, to distinguish data, control words or information concerning the tables. The selection input CS of the housing 44 is connected to the output UARTS of the circuit 49. Finally, the clock input H of this housing 44 receives the output CLK from the processing unit 40.

The operation of the circuit represented on FIG. 4 is as follows: As long as the central processing unit 9 does not transmit an order in the direction of the keyboard by transmitting a signal TD to the input RD of the circuit 44, signal which, via the output RRDY, causes an interruption on the input 55 of the processing unit 40, the processing unit 40 only concerns itself with management of the keyboard and decoding of this keyboard according to the table corresponding to the position of the pages. When the processor 40 is concerned with decoding the keyboard, the latter starts by reading the data supplied by the outputs of the circuit 47 for decoding the position of the pages. Then, during a second machine cycle, reads the data supplied by the output of the circuit 46 for decoding the line of the keyboard. The first reading enables the address lines A0, A12 to select one of the tables T1, T3 corresponding to the actual position of the pages of the booklet 2 on the keyboard, while the second reading enables the address A0, A12 to be completed so as to select from this table the address of the ASCII code of a character corresponding to the key activated. The corresponding ASCII code is then delivered to the data bus D0, D7 to be temporarily stored in a stack of Read/Write memory 42. The functioning of the processor 40 remains the same as long as the central processing unit 9 has not signalled, via the series interfaces 8, 44, that it was disposed to accept data. Whenever the central processing unit 9 signals that it is ready to receive data, the processing unit 40 is trapped by the interruption 55 towards a data output routine by the circuit 44 towards the interface 8 of the central processing unit 9. At this moment, the data stored in a stack of Read/Write memory 42 is sent in series to the interface 8 of the central processing unit.

It is clear that the number of contacts and keys of the keyboard can be modified according to requirements without necessarily changing the purpose of the invention itself. Similarly, the number of pages of the removable booklet can also be changed and it is possible to envisage applications in which booklets with four or more pages can be disposed, for example, in this particular instance, it is sufficient to merely add to the third input of the decoder 47 a third photoelectric emitter/receiver unit.

The booklets may also be supplied with the inscriptions corresponding to the applications provided by the application software which turns inside the central processing unit 9, but also enables blank booklets (without inscriptions) to be supplied so as to enable users to themselves adapt the keyboards to the contemplated application following a reprogramming of the memory 43.

Secondly, for certain applications, provision has been made to transmit data to the processing unit 40, this data corresponding to keys to be compared with the secret codes contained in the memory 43 at locations determined in advance. These secret codes and keys enable the keyboard to be locked so as to prevent it from being used, either as part of another application or with a central processing unit other than the one initially provided or even by another user or as regards all these conditions.

Finally, the central processing unit 9, whenever it wants to use the multi-purpose keyboard as a simple alphanumeric and conventional keyboard for a microcomputer, interprets the ASCII codes supplied by the table T1 as codes corresponding to the keys of an alphanumeric keyboard. This only occurs when a special application software is used, such as an invoicing software, and only when the codes furnished by the table T1 are to be interpreted according to the allocations carried forward to pages 24 and 23 of the booklet. These allocations correspond, for example, to services.

Thus, a multi-purpose keyboard now exists which in itself includes all kinds of application softwares developed for uses on microcomputers or central processing unit terminals. This keyboard associated with its application software allowing for loading of the programmable Read Only Memory 43 or any other equivalent device enabling this loading to take place, offers great use flexibility in multiple applications ranging from use in the hotel and restaurant trades to use as a telemonitoring control station, for process control or for programming programmable controllers.

What is claimed is:

1. A multi-purpose keyboard assembly for a central processing unit with a microprocessor (9) comprising: a housing having at least one set (300) of variable allocation keys, a booklet (2) removably fixed on the housing, said booklet comprising at least two pages (30), (21) indicating the allocation of the keys; a first remote means of detection comprising light emitting cells (E0-,E1) and photoelectric receivers (R0,R1) mounted on the housing for detecting the position of the pages (20), (21) of the booklet (2); a means for providing codes to the central processing unit (9) in response to the detection of the position of the pages (20), (21) of the booklet (2) and in response to the actuation of a key (32) of the keyboard belonging to the one set (300) of keys, said means for providing codes comprising a scanning keyboard interface (45), (46), a keyboard processing unit (40) a data bus (401) and a programmable read only memory (431); said scanning keyboard interface (45) being connected through the data bus (401) to the processing unit (40); the programmable read only memory (43) containing tables (T1,T4) corresponding to the keys and the codes to be provided to the central processing unit (9) according to the position of the pages (20), (21) of the booklet detected by the first remote means.

2. A keyboard assembly according to claim 1 further comprising a read only memory (41) for storing the management program of the keyboard and orders originating from the central processing unit (9).

3. A keyboard assembly according to claim 2, further including a memory means (42) for temporarily storing a plurality of codes to be transmitted, said plurality of codes corresponding to the actuation of a plurality of keys (32) and an asynchronous transmission and receiving circuit operating as a slave to the central processing unit (9).

4. A keyboard assembly according to claim 3 wherein the booklet (2) is removably fixed by means of a binding (22) including rings (223) extending beyond the surface of the pages (20), (21) by tongues (220), (221) which are housed under the front face (1A) of the keyboard by means of a cut (13) made in the front face (1A) of the keyboard in a zone adjacent to the set of variable allocation keys (300).

5. A keyboard according to claim 4 including two sets (300), (330) of variable allocation keys separated by a zone on the front face of the keyboard and including an opening (13) whose size is adapted for receiving the binding (22) of the booklet (2).

6. A keyboard assembly according to claim 5 wherein the keys (32) comprise hollow tail pieces having an interdependent cubic base on a face of a projecting from (321) which includes a rectangular parallelepiped having a section smaller than the section of the cubic base (322).

7. A keyboard assembly according to claim 1 wherein the programmable read only memory (43) contains secret codes enabling the operation of the keyboard to be locked as regards only application software intended to be used, and for excluding any type of machine other than the one provided for in the application software, and to exclude any user number other than the one provided for in the application software.

8. A keyboard assembly according to claim 3 wherein the central processing unit (9) and an application software executed by the central processing unit is adapted to a particular trade or service, said application software comprising a management system emulating the operation of a cash register adaptable to the particular trade or service; said keyboard assembly being adaptable to the application software by replacing the booklet with another booklet (2) and reprogramming data contained in the programmable read only memory (43).

9. A keyboard assembly according to claim 3 wherein the variable allocation keys (32) includes on an upper face (3210) thereof gravures of an alphabetical keyboard.

10. A method of operation of a keyboard assembly of the type according to claim 3 comprising selecting in the programmable read only memory (43) codes corresponding to the actuated keys, subsequently to an order transmitted by the central processing unit (9) to the keyboard processing unit (40).

11. A method of operation of a keyboard assembly of the type according to claim 3 comprising: reading, by the keyboard processing unit (40) in a first step, data delivered by the photoelectric receivers (R0,R1) of the first remote means of detection and in a second step reading data delivered by the interface (46) so as to address the programmable read only memory (43) and supplying the codes according to the results of the first step and the data delivered by the scanning keyboard interface (46,45) during the second step.

* * * * *